US009766648B2

(12) United States Patent
Hashim et al.

(10) Patent No.: US 9,766,648 B2
(45) Date of Patent: Sep. 19, 2017

(54) CONTROLLER SYSTEM COORDINATED USING A TIMING SIGNAL AND METHOD OF CONTROLLER COORDINATION USING A TIMING SIGNAL

(71) Applicant: Ford Global Technologies, LLC, Dearborn, MI (US)

(72) Inventors: Hasdi R. Hashim, Ann Arbor, MI (US); Donald Charles Franks, Linden, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 703 days.

(21) Appl. No.: 13/943,020

(22) Filed: Jul. 16, 2013

(65) Prior Publication Data
US 2015/0026504 A1   Jan. 22, 2015

(51) Int. Cl.
| G06F 1/08 | (2006.01) |
| G06F 1/12 | (2006.01) |
| G06F 1/32 | (2006.01) |
| B60W 10/00 | (2006.01) |

(52) U.S. Cl.
CPC .............. *G06F 1/08* (2013.01); *B60W 10/00* (2013.01); *G06F 1/12* (2013.01); *G06F 1/3287* (2013.01); *Y02B 60/1282* (2013.01)

(58) Field of Classification Search
CPC .................................... G06F 1/04; G06F 1/08
USPC ...................... 713/500, 600; 700/3
See application file for complete search history.

(56) References Cited

U.S. PATENT DOCUMENTS

| 6,201,316 | B1 * | 3/2001 | Knecht ...................... 307/10.1 |
| 6,484,082 | B1 * | 11/2002 | Millsap et al. ................. 701/48 |
| 7,110,271 | B2 | 9/2006 | Jang et al. |
| 7,759,826 | B1 * | 7/2010 | Guo ..................... B60R 25/00 307/140 |
| 8,096,273 | B2 | 1/2012 | Myers et al. |
| 8,278,834 | B2 | 10/2012 | Inamori |
| 2002/0006139 | A1 * | 1/2002 | Kikkawa et al. ............. 370/502 |
| 2005/0160301 | A1 * | 7/2005 | Disser ........................... 713/310 |
| 2005/0231146 | A1 * | 10/2005 | De Frutos ................ H02P 7/06 318/400.23 |
| 2008/0276107 | A1 * | 11/2008 | Bogavac ...................... 713/323 |
| 2010/0063625 | A1 * | 3/2010 | Krause et al. ................ 700/245 |
| 2011/0022186 | A1 * | 1/2011 | Davlin et al. ..................... 700/3 |

(Continued)

FOREIGN PATENT DOCUMENTS

| CN | 1356208 | 7/2002 |
| CN | 202200926 | 4/2012 |
| CN | 20202402126 | 8/2012 |

OTHER PUBLICATIONS

Electronic & Computer Controller Systems Course 673 Technician Handbook, Jun. 22, 2009; 187 pages.

*Primary Examiner* — Chun Cao
(74) *Attorney, Agent, or Firm* — Carlson, Gaskey & Olds, P.C.

(57) ABSTRACT

A controller timing system according to an exemplary aspect of the present disclosure includes, among other things, a master controller to generate a timing signal, a first slave controller configured to wake in response to the timing signal, and a second slave controller configured to wake in response to the timing signal. Timing of the first slave controller and timing of the second slave controller is coordinated based on the timing signal.

13 Claims, 2 Drawing Sheets

(56) References Cited

U.S. PATENT DOCUMENTS

2012/0030330 A1\* 2/2012 Rocher et al. ............... 709/223
2013/0274897 A1\* 10/2013 Herthan et al. .................. 700/3

\* cited by examiner

CONTROLLER SYSTEM COORDINATED USING A TIMING SIGNAL AND METHOD OF CONTROLLER COORDINATION USING A TIMING SIGNAL

BACKGROUND

This disclosure relates generally to a controller system and, more particularly, to timing a controller system for a vehicle, such as an electric vehicle.

Generally, one or more battery-powered electric machines selectively drive electric vehicles. The electric machines may be used instead of, or in addition to, an internal combustion engine. Example electric vehicles include hybrid electric vehicles (HEV's), plug in hybrid electric vehicles (PHEV's), and battery electric vehicles (BEV's). Conventional vehicles, in contrast to electric vehicles, are driven exclusively by an internal combustion engine.

Electric vehicles and other devices can include a controller system that has master and slave controllers. Time triggered computing within the controller system may require that clocks of the controller system are synchronized. Jitter (drift) between the clocks can cause delay in the communication system.

Time triggered interfaces, such as Flex-Ray interfaces, are often used to make sure that the clocks are synchronized. If time triggered interfaces are not used, an additional software layer and periodic message may be used to make sure that the clocks are synchronized. Both of these options increase complexity.

SUMMARY

A controller timing system according to an exemplary aspect of the present disclosure includes, among other things, a master controller to generate a timing signal, a first slave controller configured to wake in response to the timing signal, and a second slave controller configured to wake in response to the timing signal. Timing of the first slave controller and timing of the second slave controller is coordinated based on the timing signal.

In a further non-limiting embodiment of the foregoing system, the timing signal is a pulse width modulated signal.

In a further non-limiting embodiment of any of the foregoing systems, the system includes a clock of the first slave controller and a clock of the second slave controller. Both clocks are configured to start at the same time based on the timing signal.

In a further non-limiting embodiment of any of the foregoing systems, the system includes a clock of the first slave controller and a clock of the second slave controller. Both clocks are configured to wake in response to a pulse of the timing signal.

In a further non-limiting embodiment of any of the foregoing systems, the pulse is a first pulse, and the clocks of the first and second slave controllers are configured to shut down if a second pulse of the timing signal is not detected within a set time after the first pulse.

In a further non-limiting embodiment of any of the foregoing systems, the set time is from 1 to 100 milliseconds.

In a further non-limiting embodiment of any of the foregoing systems, the clocks of the first and second slave controllers are configured to wake in response to a rising edge of the pulse.

In a further non-limiting embodiment of any of the foregoing systems, the master controller is a powertrain control module of an electric vehicle.

In a further non-limiting embodiment of any of the foregoing systems, the master controller is configured to wake in response to an input from a vehicle key, a battery plug-in, or both.

A method of controller system timing according to another exemplary aspect of the present disclosure includes, among other things, generating a timing signal at a master controller, communicating the timing signal to a first slave controller and a second slave controller, waking the first slave controller and the second slave controller with the timing signal, and coordinating timing of the first slave controller and the second slave controller based on the timing signal.

In a further non-limiting embodiment of the foregoing method, the timing signal is a pulse width modulated signal.

In a further non-limiting embodiment of any of the foregoing methods, the method may include using the timing signal to synchronize a clock of the first slave controller with a clock of the second slave controller.

In a further non-limiting embodiment of any of the foregoing methods, the method may include waking a clock of the first slave controller and a clock of the second slave controller with a pulse of the timing signal.

In a further non-limiting embodiment of any of the foregoing methods, the pulse is a first pulse, and the clocks of the first and second slave controllers are configured to shut down if a second pulse of the timing signal is not detected within a set time after the first pulse.

In a further non-limiting embodiment of any of the foregoing methods, the set time is from 1 to 100 milliseconds.

In a further non-limiting embodiment of any of the foregoing methods, the method uses a rising edge of the pulse to wake both a clock of the first slave controller and a clock of the second slave controller.

In a further non-limiting embodiment of the foregoing method, the method communicates the timing signal from a master controller to both the first slave controller and the second slave controller.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
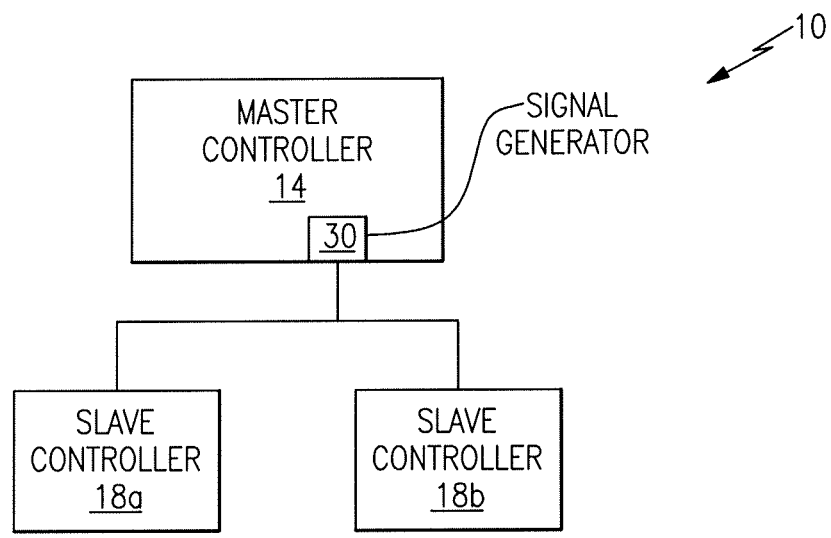
FIG. 1 illustrates a schematic view of a controller timing system.

Referring to FIG. 1, an example controller timing system 10 includes a master controller 14, a first slave controller 18*a*, and a second slave controller 18*b*. In this example, the master controller 14 has unidirectional control over the slave controllers 18*a* and 18*b*. Each slave controller 18*a* and 18*b* can have their own slave controllers.

Figure 2:
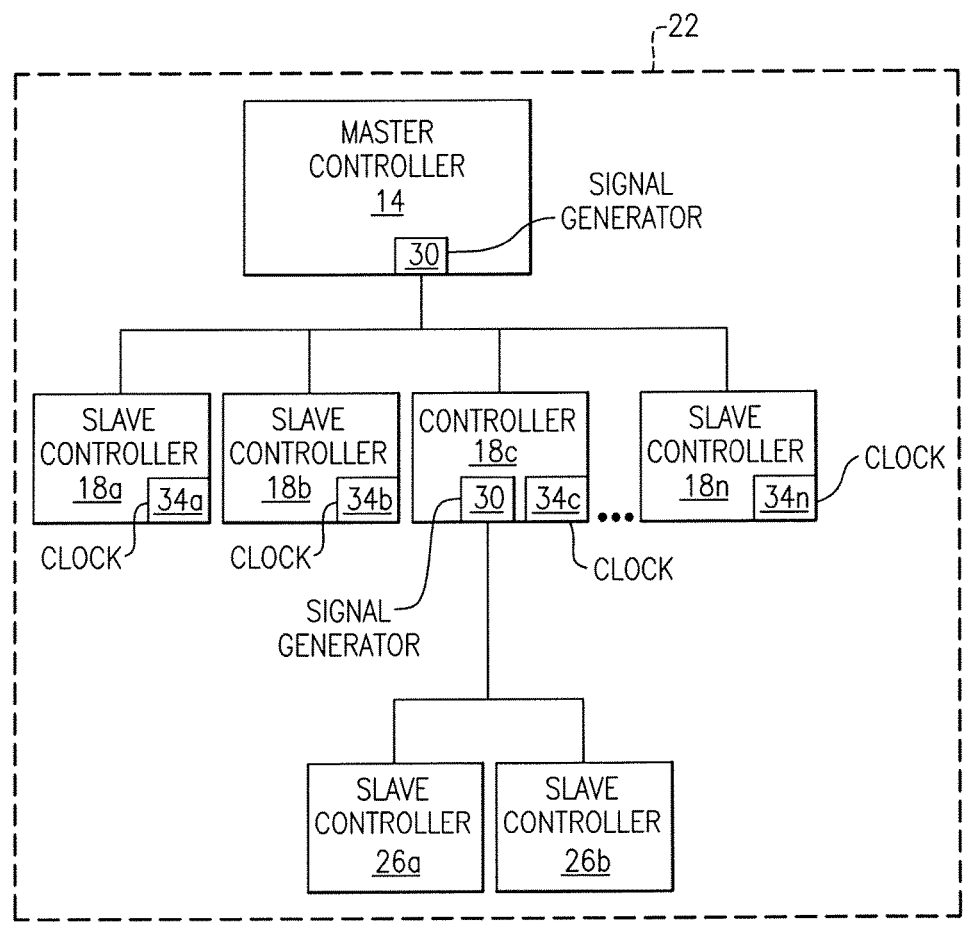
FIG. 2 illustrates a schematic view of the controller timing system of FIG. 1 used in connection with an electric vehicle.

As shown in FIG. 2, the example controller timing system 10 is used within a hybrid electric vehicle (HEV) 22 to control a braking system, for example. The master controller 14 can have unidirectional control over additional slave controllers 18c-18n.

The controller 18c has unidirectional control over slave controllers 26a-26b. The controller 18c is thus a master controller relative to the slave controllers 26a-26b. The controller 18c is also a slave controller relative to the master controller 14.

In some examples, the master controller 14 controls from six and eight slave controllers 18a-18n. In some examples, the master controller 14 controls up to twenty slave controllers 18a-18n.

Although described in connection with the HEV 22, it should be understood that the concepts described herein are not limited to HEV's and could extend to other electric vehicles, including but not limited to, plug-in hybrid electric vehicles (PHEV's) and battery electric vehicles (BEV's).

The concepts described herein could also extend to other vehicles, such as vehicles driven exclusively by an internal combustion engine, and other systems, such a computer systems outside of vehicles.

In this example, the master controller 14 is an engine control unit (ECU) of the HEV 22. The master controller 14 could, for example, be a powertrain control module (PCM).

The slave controllers 18a-18c can be a vehicle system controller, a friction brake controller, and an electric drive controller, respectively. The master controller 14 sends commands to the slave controllers 18a-18c to coordinate braking of the HEV 22. An example command may cause, for example, the friction brake controller to apply more friction braking via calipers.

The example master controller 14 wakes up in response to relatively simple sources like an input from a vehicle key, plugging in a battery of the HEV 22, or both. The input from the vehicle key may be a specific position of the key, such as the key positioned in a run position or a start position.

Figure 3:
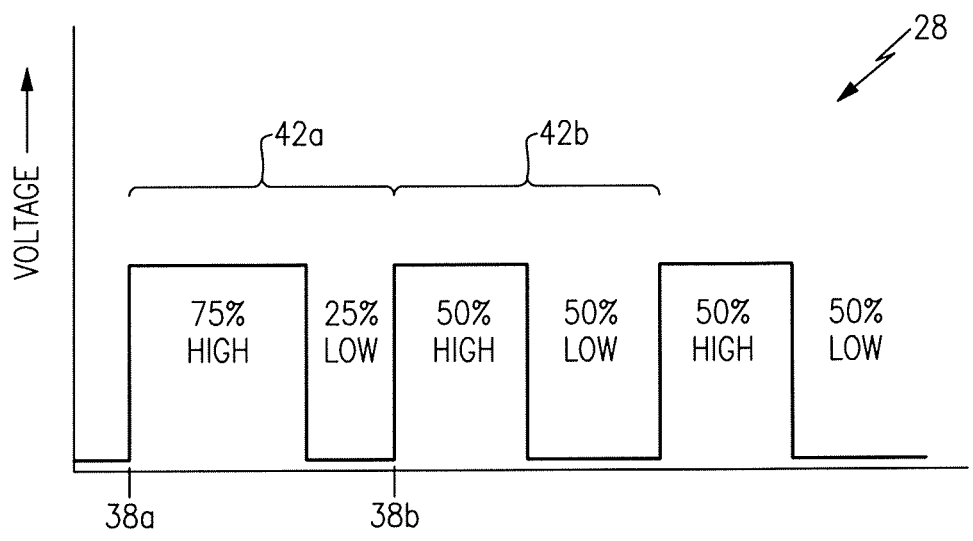
FIG. 3 illustrates a timing signal suitable for use in connection with the controller timing system of FIGS. 1 and 2.

Referring now to FIG. 3 with reference again to FIG. 1, the master controller 14, when awake, can communicate a timing signal 28 from a signal generator 30 to both the first slave controller 18a and the second slave controller 18b. The timing signal 28, once received, wakes both the first slave controller 18a and the second slave controller 18b. In this example, the timing signal 28 is a 100 Hz pulse width modulated signal.

Waking the first slave controller 18a starts a clock 34a of the first slave controller 18a. Waking the second slave controller 18b starts a clock 34b of the second slave controller 18b. The first slave controller 18a and the second slave controller 18b wake, or activate, in response to receiving a rising edge 38a of the timing signal 28. The starting of the clocks 34a and 34b are thus coordinated to each other. In this example, the clocks 34a and 34b are effectively synchronized since both clocks 34a and 34b start at the same time in response to the rising edge 38a. The clocks 34a and 34b are internal clocks in this example.

The controller 18c can synchronize slave controllers 26a to 26b with the clock 34c in a similar manner.

In this example, the rising edge 38a is a portion of a first pulse 42a of the timing signal 28. The first and second slave controllers 18a and 18b are both programmed to shut down if a rising edge 38b of a second pulse 42b of the timing signal 28 is not received within a set time. For example, if the rising edge 38b of the second pulse 42b is not received in 10 to 20 milliseconds of the rising edge 38a of the first pulse 42a, the first and second slave controllers 18a and 18b shut down or begin to shut down. Shutting down the controllers 18a and 18b conserves power.

The timing signal 28 may be used to continually adjust the timing of the clocks 34a and 34b. For example, a duty cycle of every one out of one-hundredth pulses within a second may be seventy-five percent, and the duty cycles of the remaining ninety-nine pulses may be from twenty-five to fifty percent. The seventy-five percent marks the start of a new second. The remaining ninety-nine pulses mark the starts of 10 millisecond multiples within the second. Alternatively, the start of a new second could be marked by sending two 200 Hz pulses of any duty cycle, with the remaining ninety-nine pulses still as 100 Hz pulses.

In this example, a duty cycle of the first pulse 42a is about seventy-five percent, and a duty cycle of the second pulse 42b and remaining pulses of the timing signal 28 is about fifty percent.

In some examples, ninety-nine bits of data can be encoded every second by, for example, specifying a fifty percent duty cycle as a bit-1 and a twenty-five percent duty cycle as a bit-0. Of course, other duty cycles could be specified. The bits of data could represent, for example, an actual time of day, an equizzer result, etc. The bits of data could be used to communicate other information, such as information about start-up of the HEV 22, shut-down of the HEV 22, refueling, etc.

The features of the disclosed examples may be incorporated into the wake-up lines of existing controller systems. No additional pinouts or wiring may be required to implement these features. Another feature of these examples is that the slave controllers do not have to stay awake if the wake-up line is stuck high, which saves power. Synchronous clocks are desirable as models of the system, such as MATLAB models and simulations, often assume that clocks are synchronized across controllers.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments. Further, unless otherwise specified, the steps may be performed in any order.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A controller timing system, comprising:
   a master controller to generate a pulse width modulated signal a as timing signal;
   a first slave controller configured to wake in response to the timing signal; and
   a second slave controller configured to wake in response to the timing signal, wherein timing of the first slave controller and timing of the second slave controller is coordinated based on the timing signal,
   wherein the master controller is a powertrain control module of an electric vehicle, and is configured to wake in response to an input from a vehicle key, a battery plug-in, or both.

2. The system of claim 1, including a clock of the first slave controller and a clock of the second slave controller, both clocks configured to start at the same time based on the timing signal.

3. A controller timing system, comprising:
a master controller to generate a timing signal;
a first slave controller having a clock configured to wake in response to a pulse of the timing signal; and
a second slave controller having a clock configured to wake in response to the pulse of the timing signal, wherein timing of the first slave controller and timing of the second slave controller is coordinated based on the timing signal.

4. The system of claim 3, wherein the pulse is a first pulse, and the clocks of the first and second slave controllers are configured to shut down if a second pulse of the timing signal is not detected within a set time after the first pulse.

5. The system of claim 4, wherein the set time is from 1 to 100 milliseconds.

6. The system of claim 3, wherein the clocks of the first and second slave controllers are configured to wake in response to a rising edge of the pulse.

7. A method of controller system timing, comprising:
generating a timing signal at a master controller;
communicating the timing signal to a first slave controller and a second slave controller;
waking a clock of the first slave controller and a clock of the second slave controller with a pulse of the timing signal; and
coordinating timing of the first slave controller and the second slave controller based on the timing signal.

8. The method of claim 7, wherein the timing signal is a pulse width modulated signal.

9. The method of claim 7, including using the timing signal to synchronize the clock of the first slave controller with the clock of the second slave controller.

10. The method of claim 7, wherein the pulse is a first pulse, and the clocks of the first and second slave controllers are configured to shut down if a second pulse of the timing signal is not detected within a set time after the first pulse.

11. The method of claim 10, wherein the set time is from 1 to 100 milliseconds.

12. The method of claim 11, using a rising edge of the pulse to wake both the clock of the first slave controller and the clock of the second slave controller.

13. The method of claim 7, communicating the timing signal from the master controller to both the first slave controller and the second slave controller.

* * * * *